United States Patent [19]
Morisod

[11] Patent Number: 6,164,431
[45] Date of Patent: Dec. 26, 2000

[54] ROLLER OR BELT CONVEYING DEVICE FOR SHEET-LIKE OR PLATE-LIKE WORKPIECES OF LOW SPECIFIC GRAVITY

[75] Inventor: Jean-Bernard Morisod, Villars-Ste-Croix, Switzerland

[73] Assignee: Bobst S.A., Lausanne, Switzerland

[21] Appl. No.: 09/082,829

[22] Filed: May 21, 1998

[30] Foreign Application Priority Data

May 30, 1997 [CH] Switzerland .............................. 1274/97

[51] Int. Cl.⁷ ..................................... B65G 47/24
[52] U.S. Cl. .................. 198/415; 198/689.1; 198/860.3; 198/860.5
[58] Field of Search ................... 198/415, 689.1, 198/860.5, 860.3

[56] References Cited

U.S. PATENT DOCUMENTS

| | | | |
|---|---|---|---|
| 3,240,491 | 3/1966 | Buccicone | 198/689.1 |
| 3,267,637 | 8/1966 | Baker . | |
| 3,366,221 | 1/1968 | Preisig . | |
| 3,680,677 | 8/1972 | Branch et al. | 198/689.1 |
| 3,701,412 | 10/1972 | Wriedt | 198/689.1 |
| 3,826,568 | 7/1974 | Hudson | 198/689.1 |
| 4,019,627 | 4/1977 | Eggert . | |
| 4,646,911 | 3/1987 | Pearl et al. | 198/689.1 |
| 4,651,984 | 3/1987 | Emrich | 198/689.1 |
| 4,676,361 | 6/1987 | Heisler | 198/394 |
| 4,807,739 | 2/1989 | Wolf . | |
| 5,051,145 | 9/1991 | Lenhardt | 198/689.1 |
| 5,092,447 | 3/1992 | Wyman | 198/415 |
| 5,161,678 | 11/1992 | Garvey | 198/860.5 |
| 5,282,528 | 2/1994 | Hudson . | |
| 5,373,933 | 12/1994 | Planke et al. | 198/689.1 |

FOREIGN PATENT DOCUMENTS

| | | | |
|---|---|---|---|
| 423446 | 4/1967 | Switzerland . | |
| 648473 | 2/1979 | U.S.S.R. | 198/415 |

*Primary Examiner*—Douglas Hess
*Attorney, Agent, or Firm*—Allen N. Friedman; McCarter & English LLP

[57] ABSTRACT

A conveying device for sheet-like workpieces having low specific gravity (21), such as paper or cardboard, comprises two median conveying elements (11, 12) arranged side by side along the path of the workpieces (21), for changing the orientation of the sheets or plates about a perpendicular axis. Separate drive mechanisms with adjustable speed (18) are connected to each of the median conveying elements (11, 12). A plenum (22) provided with a fan (23) is used to apply a downward air pressure to the workpieces (21), pressing them against the median conveying elements (11, 12) in order to transmit different speeds to each of the surface parts of the workpieces (21) in contact with the respective conveying elements (11, 12).

6 Claims, 4 Drawing Sheets

ROLLER OR BELT CONVEYING DEVICE FOR SHEET-LIKE OR PLATE-LIKE WORKPIECES OF LOW SPECIFIC GRAVITY

RELATED APPLICATIONS

This application claims priority of Swiss Application No. 1997 1274/97, filed May 30, 1997.

FEDERALLY SPONSORED RESEARCH

Not Applicable

BACKGROUND OF THE INVENTION

1. Field of the Invention

The present invention relates to a roller or belt conveying device for sheet-like or plate-like workpieces, having low specific gravity such as paper or cardboard, comprising means for changing the orientation of these workpieces about an axis perpendicular to said sheets or plates, as well as to an utilization of this conveying device.

2. Description of the Background Art

Conveying devices, in particular in the manufacturing process, are often associated with means for orienting the conveyed workpieces in a determined position. This is particularly true in the case of folder gluers for the manufacture of boxes or other packaging containers from blanks of paper or cardboard. In fact, in this kind of machine, in which the folding and gluing operations are performed on moving workpieces, it is very important that these workpieces are in predetermined positions in order to carry out these operations. This avoids serious interference with the members that execute the different folding and gluing operations.

To this aim, a conveyor for a so-called two working axis folder gluer machine has been proposed in which two conveyor belts are placed at 90° one from the other, and a transfer element interposed at the vertex of the angle between these two conveyor belts. This transfer element is made up of an intermittently operating conveyor belt, which successively moves the blanks of paper or cardboard from one conveying belt to the other. This method does not permit in-line operation thus appreciably increasing the space requirement, as compared to an in-line machine. In addition, the succession of blanks of paper or cardboard must be regular, since the transferring element must be at a standstill when setting the blank of paper or cardboard and it only starts when this blank of paper or cardboard is well positioned on the transfer element.

Another method for transferring a sheet of paper or cardboard between two conveyor belts arranged at right angle has been proposed in U.S. Pat. No. 5,282,528. In this solution the transfer element consists of two adjacent conveyor belts oriented along a diagonal line connecting two perpendicular conveyor belts. The workpieces to be transferred are moved along this transfer section at a speed which is higher than the speed of the conveyor belts by a ratio that is proportional to the length of a diagonal line considered as the hypotenuse of an imaginary right triangle. With this solution it is possible to operate without maintaining a regular interval between the workpieces to be transferred, but two conveyors arranged at right angle with respect to one another are still required, a 90° rotation of the workpiece is to be made. Consequently, this solution does not solve the problem of the space requirement. Further, if a rotation of 180° has to be executed, two 90° rotation systems in series would be necessary.

Rotating blanks in their plane, during their transport has also been suggested, thus enabling in-line operation. For this purpose, two coaxial rotating members arranged on both sides of the plane of the blanks are used to seize and to turn them. With such mechanism, however, difficulties occur when the blank already includes some folded parts, which have a tendency to unfold. In this case, the operation of rotating members is inconsistent with the presence of continuous guiding elements provided to maintain the parts in a folded position.

A solution intended to meet this difficulty has been proposed in U.S. Pat. No. 3,366,221. The members adapted to turn the blanks consist of perforated plates which are fixed to the conveyor are selectively connected to a suction source. When the perforated plate comes to where the blank has to make a rotation in its plane, it is connected to the suction source, so that by turning, it drives the blank positioned thereon. Therefore, it is possible to position a fixed guide above the path of the blanks to maintain the folded parts in a turned down position. The drawback of this solution is that it is relatively complicated, hence onerous. Also, it requires that the blanks follow one another with constant spacing between them.

It has also been proposed to change the orientation of workpieces having flat contact surfaces by using two conveyors arranged side by side, each separately driven at different speeds, causing a rotation of the workpieces being in contact simultaneously with the two conveyors. To enable two parts of contact surfaces of a common workpiece to be driven at different speeds, obviously, the specific gravity of the conveyed workpieces must be adequate to develop, between each conveyor and the respective contacting surface part, a frictional force great enough to ensure that the portion of the common contacting surface in contact with one conveyor is driven at a different speed than the part in contact with the other conveyor. If that is not the case, problematical sliding occurs and it becomes impossible to determine the rotating angle to an adequate degree of accuracy. In the case of folder gluers for the manufacture of workpieces of paper or cardboard, in particular for the manufacture of boxes or other packaging, the low specific gravity of the blanks of cardboard plates or paper sheets does not actually permit use of a method with two conveyors arranged side by side for turning these plates or sheets around an axis perpendicular to their surface in contact with the conveyor.

SUMMARY OF THE INVENTION

The aim of the present invention is to meet the difficulties of the above-mentioned solutions. For this purpose, the present invention is directed to a roller or belt conveying device of the aforesaid type, in which the means for changing the orientation of said workpieces comprise: (a) two conveying elements arranged side by side along the path of the workpieces, (b) separate drive means with adjustable speed, connected to each of the conveying elements, and (c) means for applying to these workpieces a downward pressure in the direction of the conveying elements, chosen such that, added to the specific gravity of the workpieces, the resulting frictional force between the conveying elements and the workpieces is enough to transmit to each of the surface parts of said workpieces, adjacent to said respective conveying elements, speeds approximately corresponding to the speeds of each of the conveying elements.

The invention is also aimed at use of this conveying device for a folder gluer machine for the manufacture of boxes and other packaging workpieces.

The advantages resulting from the present invention include allowing rotation of workpieces having low specific mass on an in-line conveyor and also permitting a random spacing between the conveyed workpieces. Another advantage is keeping the parts that have already been folded, in a turned down position as they are being transported and rotated.

Other advantages as well as other particularities of the present invention will become evident from the reading of the following description as well as from the enclosed drawings illustrating, schematically and by way of example, an embodiment of the conveying device that is the object of the present invention.

DETAILED DESCRIPTION OF THE INVENTION

The conveying device illustrated in FIGS. 1 to 4 is adapted to be placed between two roller or belt conveyors that are part of a machine for the manufacture of workpieces of paper or cardboard, and more particularly though not exclusively, of a folder gluer for the manufacture of boxes and other packagings.

Figure 1:
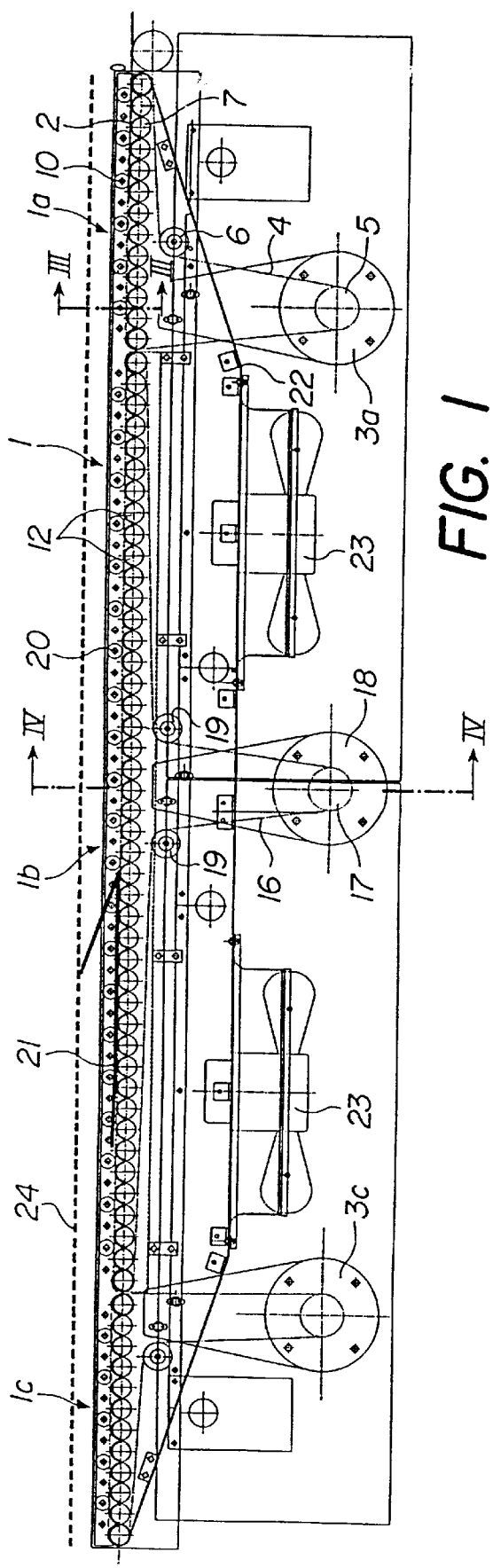
FIG. 1 is a partial front view of this conveying device with rollers.
Figure 3:
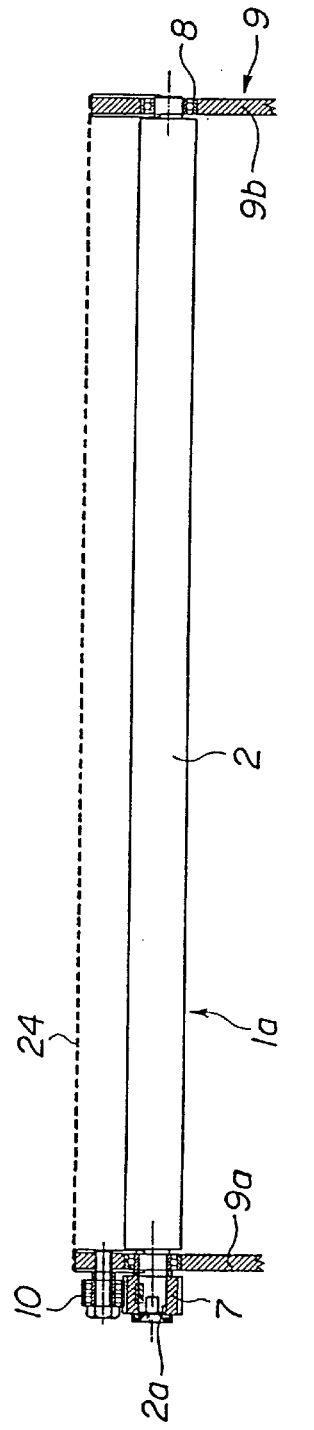
FIG. 3 is a sectional view according to line III—III of FIG. 1.

FIG. 1 illustrates a roller conveyor according to the present invention, comprising two series of rollers 2 extending over the whole width of the roller conveyor 1 (FIG. 3) arranged at each end of the conveyor 1 making up the input 1a and output 1c sections of the conveyor, separated by a median section 1b. It should be noted that, since the conveyor 1 is symmetric with respect to its center, the input 1a and output 1c sections may be inverted by reversing the direction of rotation of the rollers 2.

A driving motor 3a is used to drive the rollers 2 of the input section 1a and another driving motor 3c is used to drive the rollers of the output section 1c of the conveyor 1. To accomplish this, an endless belt 4, preferably a flat or toothed belt, passes around the output shaft 5 of the motor 3a, onto a tension roller 6 as well as onto a series of toothed rollers 7, keyed or pinned on the shafts of the rollers 2 and pivoted in ball bearings 8 mounted in two parallel vertical plates 9a, 9b making up a frame 9 carrying the conveying device 1. Counterrollers 10, pivoted on the external sides of each of the parallel vertical plates 9a, 9b of this frame 9, are used to ensure an efficient contact between the toothed belt 4 and the toothed rollers 7. Since the drive mechanism of the output section 1c of the conveyor 1 by the motor 1c is identical with the mechanism of the input section, it is not necessary to repeat the description.

Figure 5:
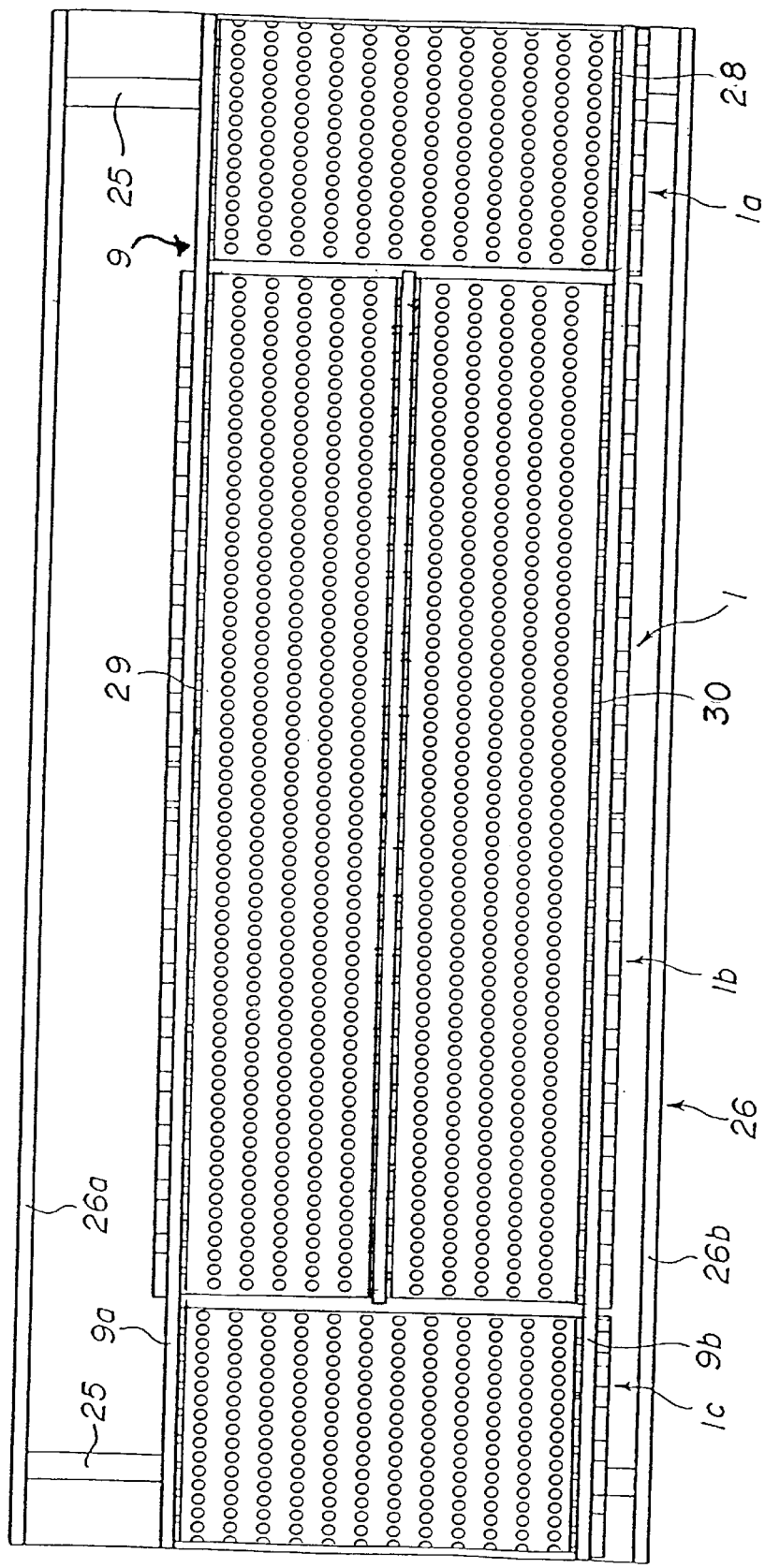
FIG. 5 is a top view of this conveying device with belts.

Alternatively, it is also possible to replace the rollers 2, 11 and 12 by belt conveyors. This alternate embodiment is schematically illustrated in FIG. 5. The mechanisms utilized for driving the belts 28, 29, 30 are analogous to the mechanisms described above for driving rollers 2, 11, 12, in a manner well known in the art.

Figure 4:
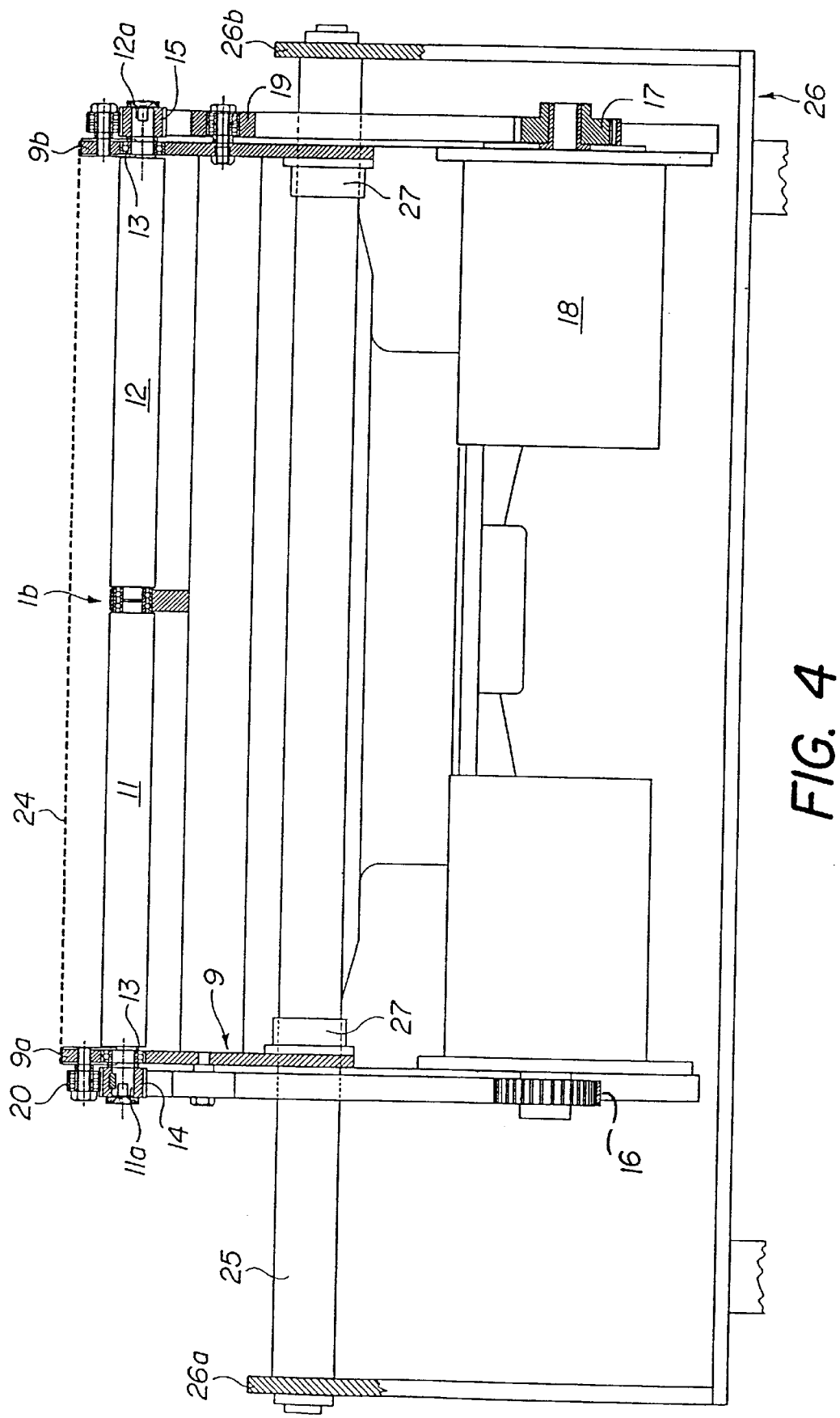
FIG. 4 is a sectional view according to line IV—IV of FIG. 1.

The median part 1b of the conveyor 1, illustrated in FIGS. 1 and 4, comprises two series of transport rollers 11 and 12 arranged side by side, the length of each roller 11, 12 approximately corresponding, preferably, to the half of the width of the conveyor 1. Each of these rollers 11, 12 is pivoted at its two ends in the ball bearings 13 fitted in the plates 9a, 9b of the frame 9. A toothed drive roller 14 or, respectively, 15 is keyed on a shaft 11a, 12a fixed to each roller 11, 12, projecting from the respective external ends of these rollers 11, 12.

Each series of rollers 11, 12 includes an independent drive mechanism. Since these mechanisms are both identical, only one of them will be described. The drive mechanism comprises an endless driving belt 16, preferably a toothed belt, which passes around the toothed output shaft 17 of a driving motor 18, around a tension roller 19, and around the toothed roller 15 fixedly attached to the roller 12 located at an end of the median section 1b of the conveyor 1. Afterwards, said endless belt 16 passes between the rollers 15 and a series of pressure rollers 20 pivotally mounted on the frame 9. This drive mechanism is symmetric with respect to the length of the median part 1b of the conveyor 1.

Since each of the two series of rollers 11 and 12, arranged side by side, of the median section 1b of the conveyor 1, is driven by an independent drive mechanism whose speed is variable, it is possible to turn the rollers 11 of one series at a different speed from the rollers 12 of the other series.

As has been mentioned before, taking into account the low specific mass of the conveyed sheets of paper or plates of cardboard 21 (FIG. 2), the friction forces between the contact surfaces of these sheets or plates 21 and the two series of rollers 11 and 12 are not adequate to allow the parts of these sheets or plates 21 in contact with the series of rollers 11, respectively 12, to follow their respective different speeds and, thus, to perform a controlled angular movement about an axis that is perpendicular to their contact surface with these series of rollers 11 and 12.

In order to provide an adequate pressure on these blanks of sheets or plates 21 so that the friction force between these sheets or plates 21 and the two series of rollers 11 and 12 driving two parts of a common sheet or plate 21 at different speeds for turning them on themselves, a plenum 22 (FIG. 1) is provided, whose upper surface consists of the transport rollers 2, 11 and 12 of the three sections 1a, 1b and 1c of the roller conveyor 1. One or more fans 23 are situated in the bottom of the plenum 22. These fans 23 are provided to create a reduced pressure inside the plenum 22, increasing the contact pressure between the sheets or plates of paper or cardboard 21 and the transport rollers 2, 11 and 12. Obviously, the value of the pressure applied to the sheets or plates of paper or cardboard 21 can be adjusted according to the need, by varying the fan speed, thus determining the performance of the fans 23. If belt conveyors 28, 29, 30 are used, they should be perforated, to allow the application of the reduced air pressure to the sheets or plates 21 in contact with the conveyor belt surface. Evidently, an alternative implementation is use of upper plenum that is also connected to one or more fans, an excess pressure in the plenum and, consequently, a downward pressure on the sheets or plates of paper or cardboard.

Even though sheets of paper or plates of cardboard have been taken to illustrate examples of material having low specific mass, obviously, the invention is not restricted to these two materials. It is also possible to use the conveyor according to the present invention for plates of expanded polystyrene or other sheet-like or plate-like material having low specific gravity.

Figure 2:
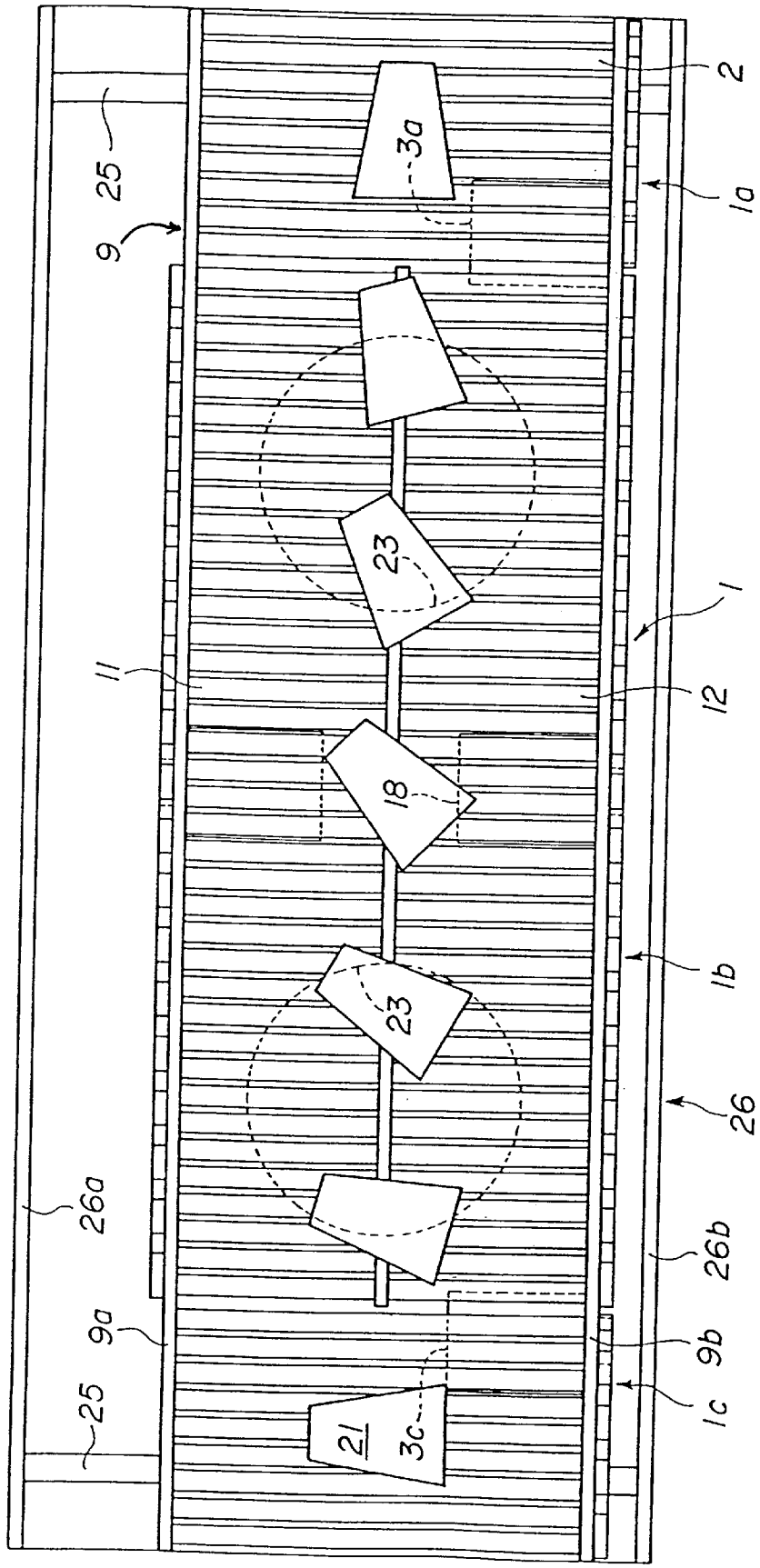
FIG. 2 is a top view of the conveying device according to FIG. 1.

This pressure assures that each surface part of a sheet or plate 21 in contact with a series of rollers 11, respectively 12, will have a speed approximately corresponding to the speed of the respective series of rollers 11, respectively 12, will have a speed approximately corresponding to the speed of the respective series of rollers 11, 12 with which it is in contact. Taking into account the difference of speed of these two series of rollers 11 and 12, the sheets or plates of paper or cardboard 21 progressively turn as they advance on the conveyor 1, as illustrated in FIG. 2. Since these speeds are adjustable, the sheets or plates 21, for example, can be turned 90° or 180°. According to the shape of these sheets or plates 21, other rotating angles can be chosen at will. Obviously, if required, the direction of rotation of these sheets or plates can also be chosen. According to which series of rollers 11, 12 is driven at a higher speed than the other, the plates or sheets of cardboard or paper 21 will turn in the clockwise or in the counter-clockwise direction.

As has already been mentioned before, this conveying device is more particularly, though not exclusively, adapted to a folder gluer machine for manufacture of workpieces of paper or cardboard, particularly for the manufacture of workpieces in the field of packaging. In this case, after having folded a side of the plate 21, in an upstream folding device the latter is turned of 90° or 180° in order to fold the adjacent or, respectively, the opposite side. In order to prevent the newly folded side from unfolding and to more or less relax back in its initial position during the rotation of the plate, which would present problems when gluing, a perforated sheet or a retaining grid 24 can advantageously be positioned at a selected distance above the rollers 2, 11 and 12 of the conveyor 1, in a plane parallel to the plane of the conveyor 1. As the case may be, it is possible to replace the perforated plate 24 by a series of bars or rollers.

As can be seen, in particular, in FIGS. 2 and 4, the frame 9 is, preferably, slidably mounted on the support shafts 25 extending parallel to one another between two parallel vertical walls 26a, 26b of a frame 26. These supported shafts 25 are made up of cylindrical bars which pass through bushings or ball bearings 27 fitted to each of the plates 9a, 9b forming the frame 9. These support shafts 25 are used in this way both to define the spacing between the vertical walls 26a, 26b of the frame 26 and, in cooperation with the ball bearings 27, as guiding means between the movable frame 9 and the frame 26. Preferably, each plate 9a, 9b carries two ball bearings 27, the bearings 27 of a plate 9a being in alignment with the respective bearings of the other parallel plate 9b. The spacing between the parallel walls 26a, 26b of the frame 26 is substantially greater than the total width of the frame 9, i.e. its width to which is added, on each side of the plates 9a, 9b, the length of the ball bearings 27. Thus, the frame 9 can be moved laterally with respect to the frame 26. This possibility of displacement of the frame 9 with respect to the frame 26 is provided in order to permit positioning of the blanks of paper or cardboard 21 in accordance with their shape, so that they are aligned with respect to the central axis of the folder gluer machine located downstream of the conveying device according to the present invention, after they have been rotated.

The shape of the blanks of paper or cardboard that are to be rotated can be very different and these shapes can be quite asymmetric with respect to their axis of rotation. Thus, after rotation the blank can be substantially laterally offset with respect to the translation axis of the downstream folder gluer machine. In order to take this offset into account and to compensate for it by a displacement of the conveyor 1, the frame 9 is slidable mounted in the lateral direction with regard to the frame 26. Through this arrangement, a simple adjustment of the lateral position of the frame 9 allows alignment of the blanks 21 of paper or cardboard with respect to the conveying elements of the following folder gluer. It is obviously also possible to keep the frame 9 fixed with respect to the frame 26 and to laterally displace the conveying elements of the following folder gluer, according to the position taken by the blank of paper or cardboard on the conveying device 1.

What is claimed is:

1. A conveying device for sheet-like or plate-like workpieces having low specific gravity (21), comprising means (11, 12) for changing the orientation of the workpieces (21) about an axis perpendicular to the sheets or plates, which means (11, 12) for changing the orientation of the workpieces (21) comprises two median conveying elements (11, 12) arranged side by side along the path of the workpieces, separate drive means with adjustable speed (18) connected to each of the median conveying elements (11, 12) and a plenum (22) and means (23) for producing reduced air pressure within the plenum for applying an air pressure force to the workpieces (21) downward in the direction of the conveying elements (11, 12) so that the effect of the plenum (22) and the means (23) for producing reduced air pressure is added to the specific gravity of the workpieces (21), producing a frictional force, the resulting frictional force between the conveying elements (11, 12) and the articles (21) being sufficient to transmit to a surface part of said workpieces (21), adjacent to each of said median conveying elements (11, 12), a speed approximately corresponding to the speed of each of the adjacent median conveying elements (11, 12), wherein the median conveying elements (11, 12) constitute an air permeable upper surface of the plenum (22).

2. A conveying device of claim 1 comprising a frame (26) and guiding means (25, 27) comprising support shafts (25) fixed to the frame and bushings or ball bearings (27) slidably mounting the median conveying elements (11, 12) to the support shafts (25) and adapted to permit lateral displacement of the median conveying elements (11, 12) with respect to said frame (26), transverse to the conveying path of the median conveying elements (11, 12).

3. A production line for the manufacture of packaging workpieces, by folding and gluing of blanks of paper or cardboard comprising an upstream folding device, the conveying device of claim 1 and a downstream folder gluer machine.

4. A production line of claim 3 comprising holding means (24) for holding down folded parts of the workpieces as they traverse the conveying device, disposed a selected distance above the conveying device and parallel thereto.

5. A production line of claim 4 in which the holding means (24) consists essentially of a grid, or rollers, or a series of bars.

6. A conveying device for sheet-like or plate-like workpieces having low specific gravity (21), comprising means (11, 12) for changing the orientation of the workpieces (21) about an axis perpendicular to the sheets or plates, which means (11, 12) for changing the orientation of the workpieces (21) comprises two median conveying elements (11, 12) arranged side by side along the path of the workpieces, separate drive means with adjustable speed (18) connected to each of the median conveying elements (11, 12) and a plenum (22) and means (23) for producing reduced air pressure within the plenum for applying an air pressure force to the workpieces (21) downward in the direction of the conveying elements (11, 12) so that the effect of the plenum (22) and the means (23) for producing reduced air pressure is added to the specific gravity of the workpieces (21), producing a frictional force, the resulting frictional force between the conveying elements (11, 12) and the articles (21) being sufficient to transmit to a surface part of said workpieces (21), adjacent to each of said median conveying elements (11, 12), a speed approximately corresponding to the speed of each of the adjacent median conveying elements (11, 12), wherein the median conveying elements (11, 12) constitute an air permeable upper surface of the plenum (22) and wherein the median conveying elements are perforated belts.

* * * * *